(12) United States Patent
Preiss et al.

(10) Patent No.: US 11,780,574 B2
(45) Date of Patent: Oct. 10, 2023

(54) SWASHPLATE ASSEMBLY FOR A ROTOR SYSTEM

(71) Applicant: LOCKHEED MARTIN CORPORATION, Bethesda, MD (US)

(72) Inventors: Yair Preiss, Norwalk, CT (US); Bradley M. Bauer, Fort Worth, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 71 days.

(21) Appl. No.: 17/337,719

(22) Filed: Jun. 3, 2021

(65) Prior Publication Data

US 2022/0388643 A1 Dec. 8, 2022

(51) Int. Cl.
*B64C 27/605* (2006.01)
*B64C 27/10* (2023.01)

(52) U.S. Cl.
CPC ............ *B64C 27/605* (2013.01); *B64C 27/10* (2013.01)

(58) Field of Classification Search
CPC ................. B64C 27/10; B64C 27/605; B64C 2027/7255; B64C 7/00; B64C 27/04
See application file for complete search history.

(56) References Cited

U.S. PATENT DOCUMENTS

| | | | | |
|---|---|---|---|---|
| 3,558,082 A * | 1/1971 | Bennie | ..................... | B64C 27/54 416/114 |
| 4,326,834 A * | 4/1982 | Ostrowski | ............. | B64C 27/605 416/138 |
| 4,425,082 A * | 1/1984 | Mussi | ..................... | B64C 27/32 416/61 |
| 4,573,873 A | 3/1986 | Yao et al. | | |
| 4,588,355 A * | 5/1986 | Ferris | ..................... | B64C 27/605 416/114 |
| 5,071,319 A * | 12/1991 | McCafferty | ........... | B64C 27/605 416/134 A |
| 5,083,725 A * | 1/1992 | Byrnes | .................. | B64C 27/605 416/114 |
| 5,199,849 A | 4/1993 | Leman | | |
| 5,785,497 A | 7/1998 | White et al. | | |
| 7,607,607 B2 | 10/2009 | Darrow et al. | | |
| 8,303,248 B2 | 11/2012 | Cabrera et al. | | |
| 8,840,372 B2 | 9/2014 | Girard | | |
| 8,961,138 B2 | 2/2015 | Wiinikka et al. | | |

(Continued)

FOREIGN PATENT DOCUMENTS

| | | | | |
|---|---|---|---|---|
| DE | 3620794 A | * 12/1987 | ........... | B64C 27/605 |
| FR | 2751937 A1 | * 2/1998 | ........... | B64C 27/605 |

*Primary Examiner* — Brian P Wolcott
*Assistant Examiner* — Jesse M Prager
(74) *Attorney, Agent, or Firm* — Foley & Lardner LLP

(57) ABSTRACT

A rotatable swashplate is rotatable relative to a stationary swashplate around a shaft and connects to a pitch control rod assembly. The rotatable swashplate includes an upper portion and a lower portion. The upper portion is extendable outside of a stationary swashplate and includes a plurality of lugs each configured to attach to a pitch control rod assembly, an innermost wall configured to receive a shaft, and a membrane. The lower portion is positionable within the stationary swashplate and has an outermost wall and at least one extension extending radially between the outermost wall and the innermost wall. The membrane extends radially over the at least one extension.

20 Claims, 13 Drawing Sheets

(56) References Cited

U.S. PATENT DOCUMENTS

| | | | |
|---|---|---|---|
| 9,365,288 B2 | 6/2016 | Stamps et al. | |
| 9,764,832 B2 | 9/2017 | Hoyle et al. | |
| 10,464,666 B2 * | 11/2019 | Laitenberger | ......... B64C 27/605 |
| 10,822,076 B2 | 11/2020 | Hunter et al. | |
| 10,836,479 B2 | 11/2020 | Shimek et al. | |

* cited by examiner

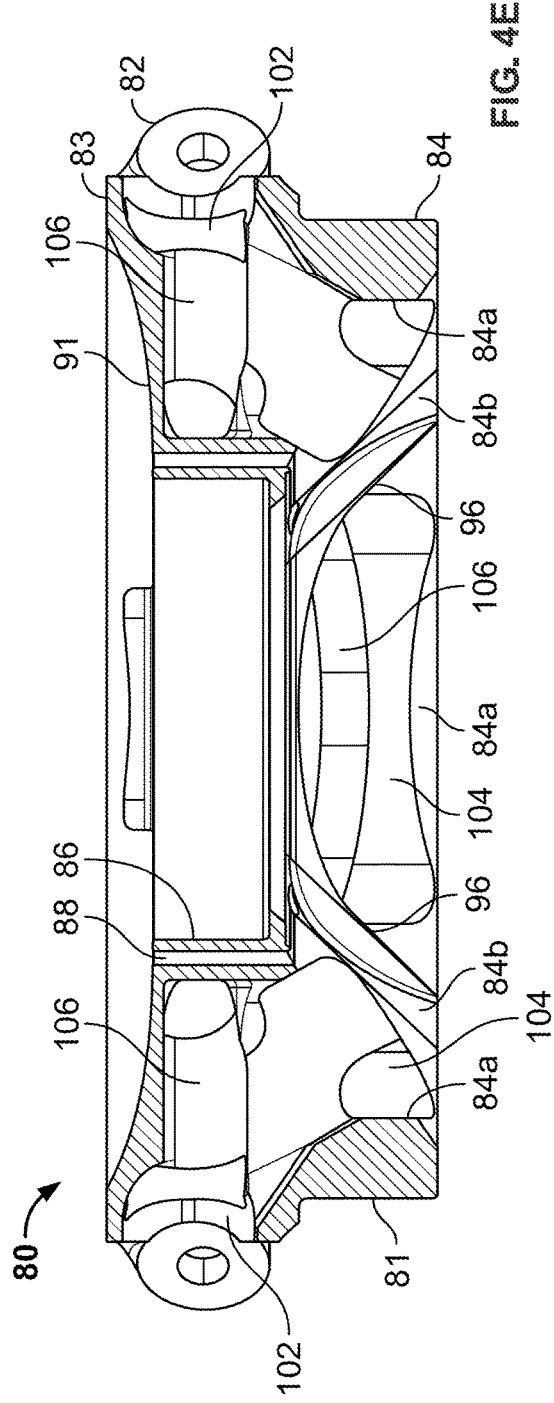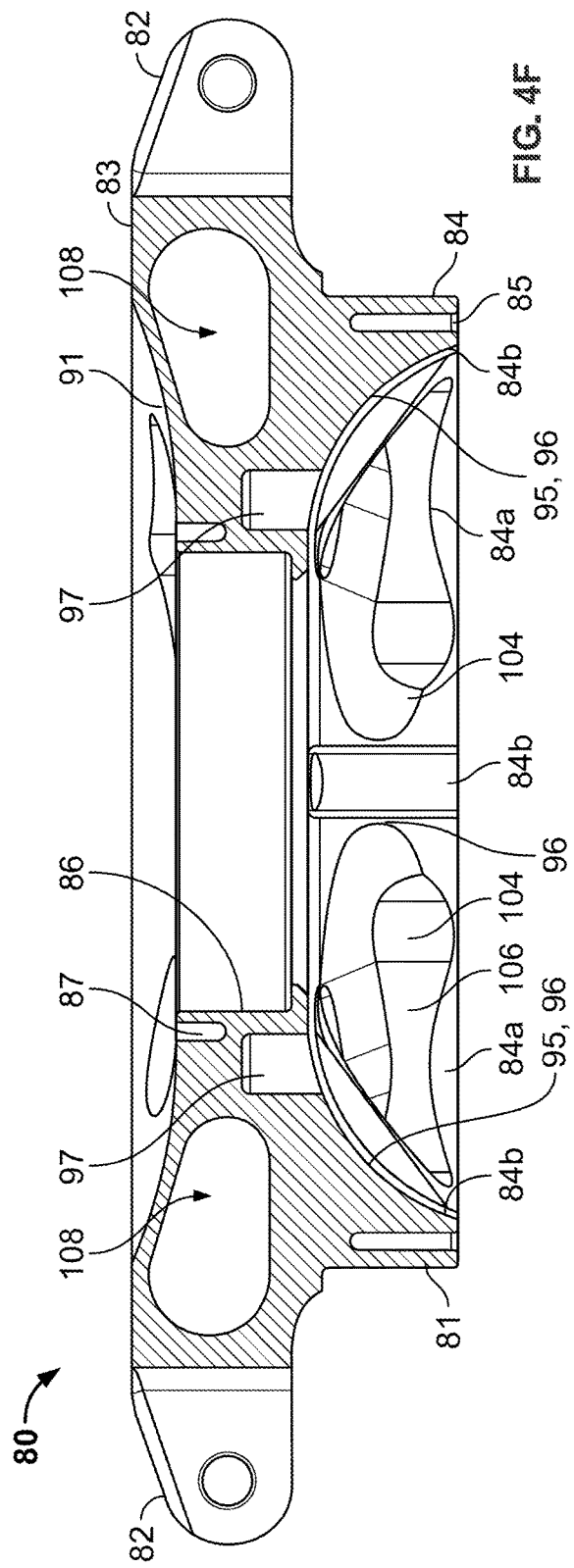

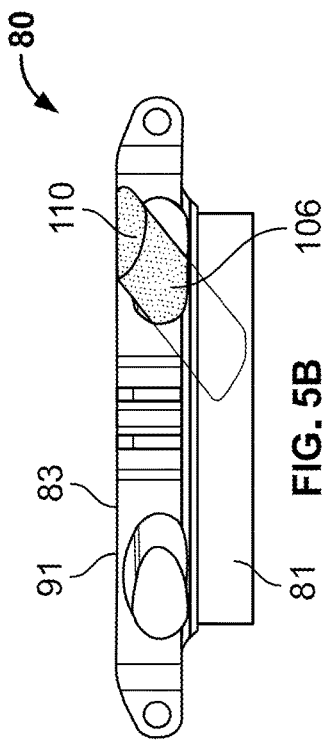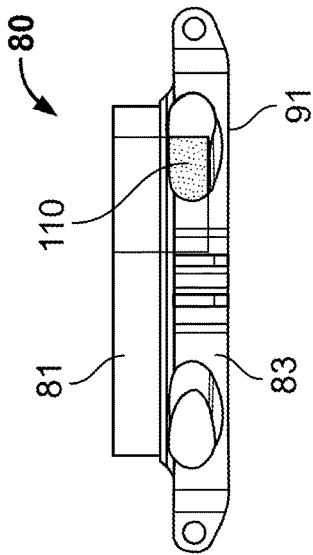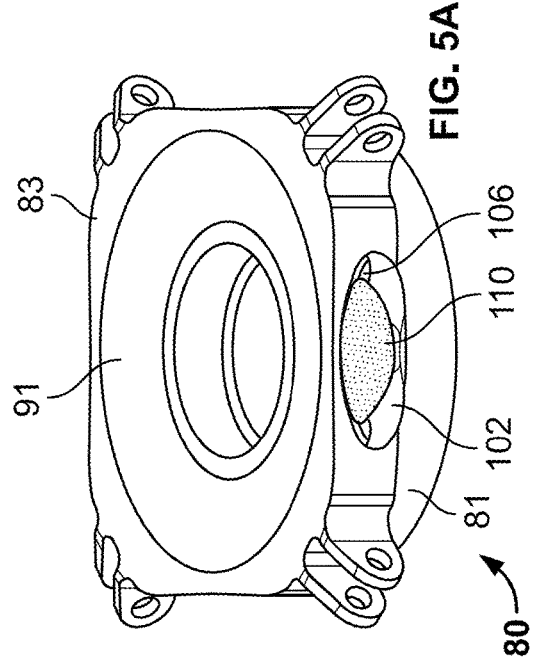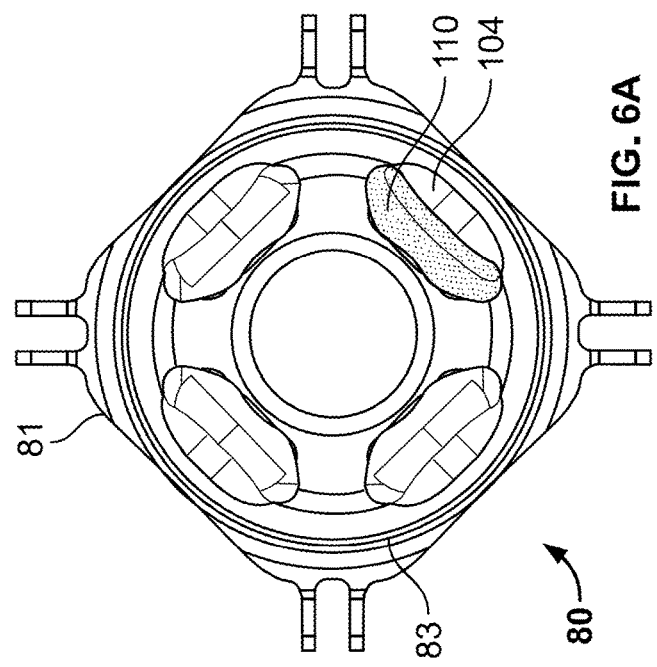

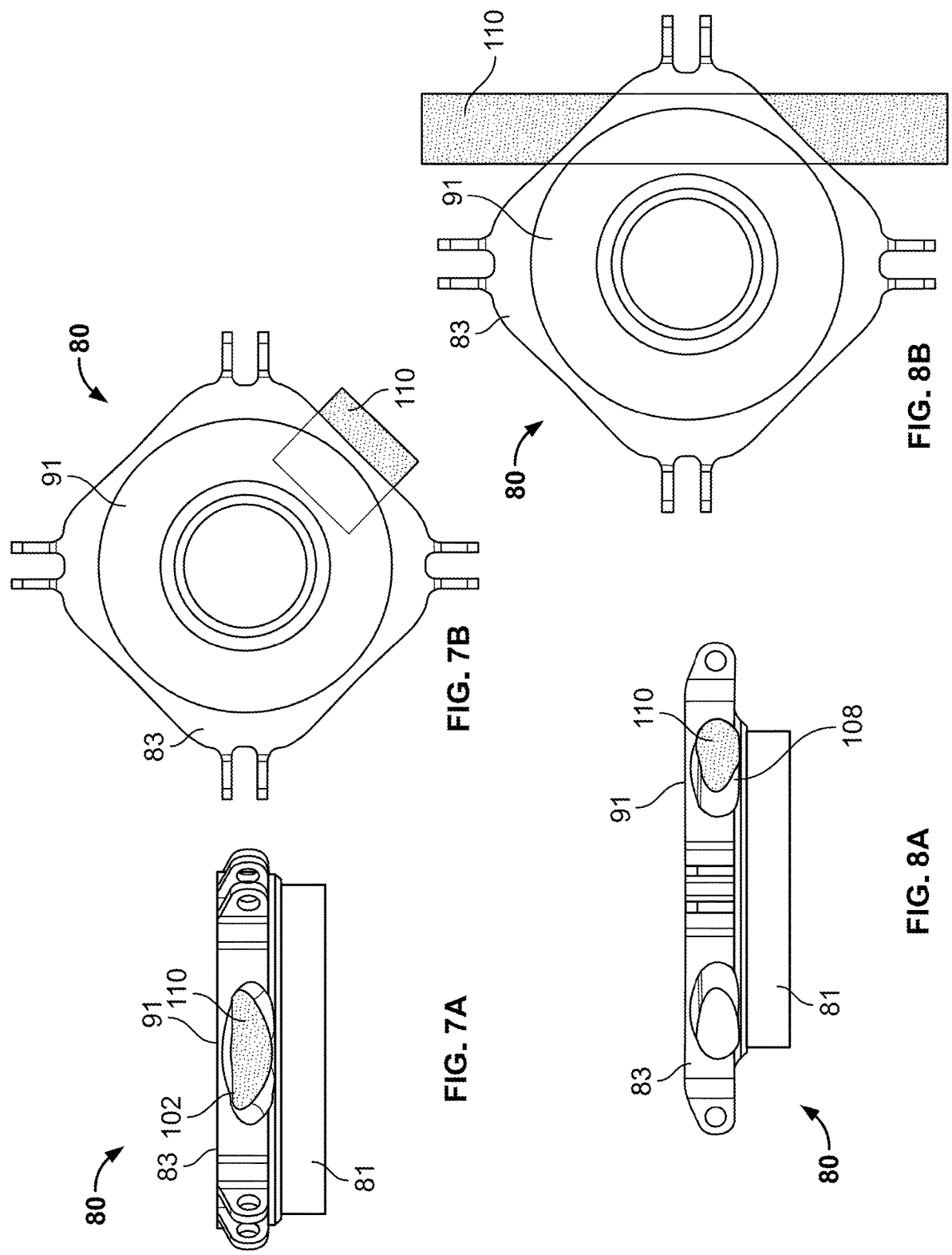

US 11,780,574 B2

SWASHPLATE ASSEMBLY FOR A ROTOR SYSTEM

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present application relates generally to a rotatable swashplate of a swashplate assembly for a rotor system of a rotary wing aircraft.

BACKGROUND

Rotatable swashplates translates inputs via flight controls of an aircraft into motion of the rotor blades of the aircraft. Typical rotatable swashplates can significantly add to the weight of the rotor assembly, and thus to the aircraft.

SUMMARY

Various embodiments provide for a rotatable swashplate that is rotatable relative to a stationary swashplate around a shaft and connects to a pitch control rod assembly. The rotatable swashplate comprises an upper portion and a lower portion. The upper portion is extendable outside of a stationary swashplate and comprises a plurality of lugs each configured to attach to a pitch control rod assembly, an innermost wall configured to receive a shaft, and a membrane. The lower portion is positionable within the stationary swashplate and comprises an outermost wall and at least one extension extending radially between the outermost wall and the innermost wall. The membrane extends radially over the at least one extension.

Various other embodiments provide for a swashplate assembly that is positionable around a shaft and connectable to a pitch control rod assembly. The swashplate assembly comprises a stationary swashplate and a rotatable swashplate rotatably attached to the stationary swashplate. The rotatable swashplate comprises an upper portion and a lower portion. The upper portion is extendable outside of the stationary swashplate and comprises a plurality of lugs each configured to attach to a pitch control rod assembly, an innermost wall configured to receive a shaft, and a membrane. The lower portion is positionable within the stationary swashplate and comprises an outermost wall and at least one extension extending radially between the outermost wall and the innermost wall. The membrane extends radially over the at least one extension.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4E is a cross-sectional view through Section 4E-4E of FIG. 4D.
FIG. 4F is a cross-sectional view through Section 4F-4F of FIG. 4D.
FIGS. 5A-5B are perspective and side views of the rotatable swashplate of FIG. 4A being cut.
FIGS. 6A-6B are perspective and side views of the rotatable swashplate of FIG. 4A being cut.
FIGS. 7A-7B are perspective and side views of the rotatable swashplate of FIG. 4A being cut.
FIGS. 8A-8B are perspective and side views of the rotatable swashplate of FIG. 4A being cut.

DETAILED DESCRIPTION

Referring to the figures generally, various embodiments disclosed herein relate to a rotatable swashplate of a swashplate assembly for a rotor system of an aircraft. The rotatable swashplate is specifically designed and configured to reduce the overall weight of the swashplate assembly, and thus the overall weight of the aircraft, while maintain a strong structural configuration with multiple layers of support.

Rotor System

Figure 1A:
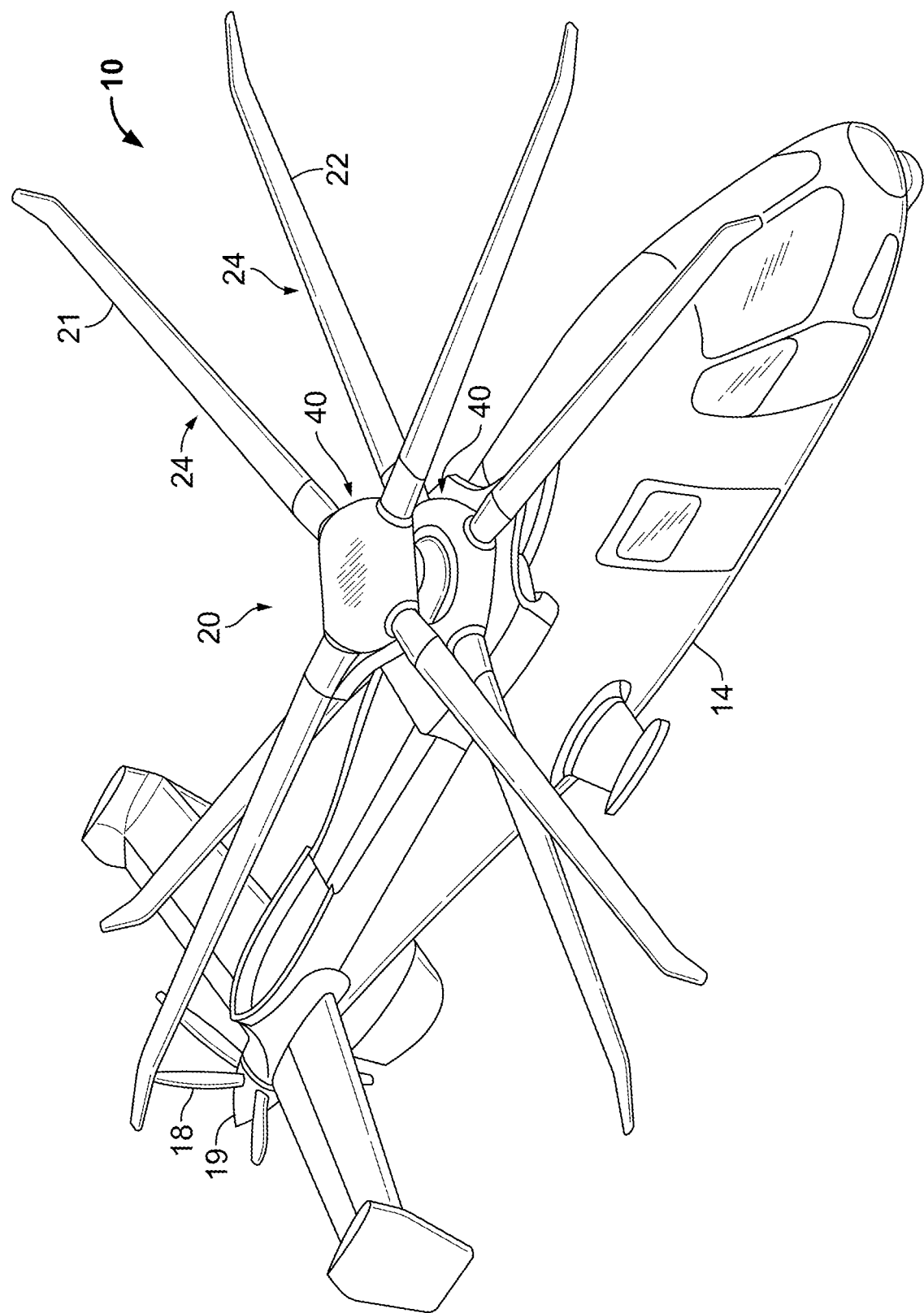
FIG. 1A is a perspective view of an aircraft according to one embodiment.
Figure 1B:
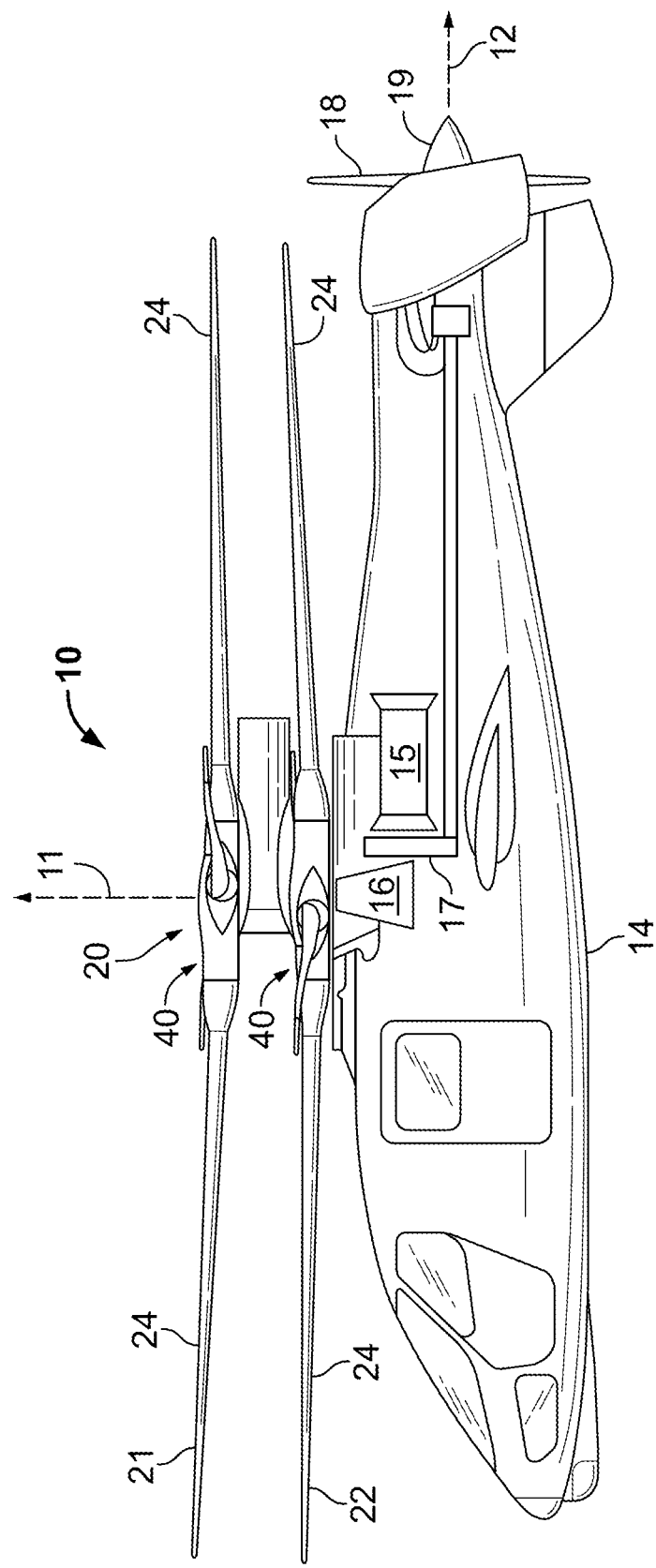
FIG. 1B is a side view of the aircraft of FIG. 1A.

FIGS. 1A-1B illustrate an exemplary vertical takeoff and landing (VTOL) high speed compound or coaxial counter-rotating rigid rotary wing aircraft 10 (which may be, for example, a helicopter or a variety of other devices which include at least one rotor blade). The aircraft 10 includes an aircraft body or airframe 14, a dual, counter-rotating, coaxial main rotor system 20, a translational thrust system 18, a transmission 16, and at least one engine 15 (which may be a gas turbine engine). The overall structure and configuration of the aircraft 10 may have a variety of different configurations, including but not limited to the structures disclosed in U.S. Pat. No. 10,822,076, the entirety of which is incorporated by reference for the systems and apparatus disclosed therein. The airframe 14 is a non-rotating frame (relative to the main rotor system 20 and the translational thrust system 18) and supports the main rotor system 20 and the translational thrust system 18.

Figure 2:
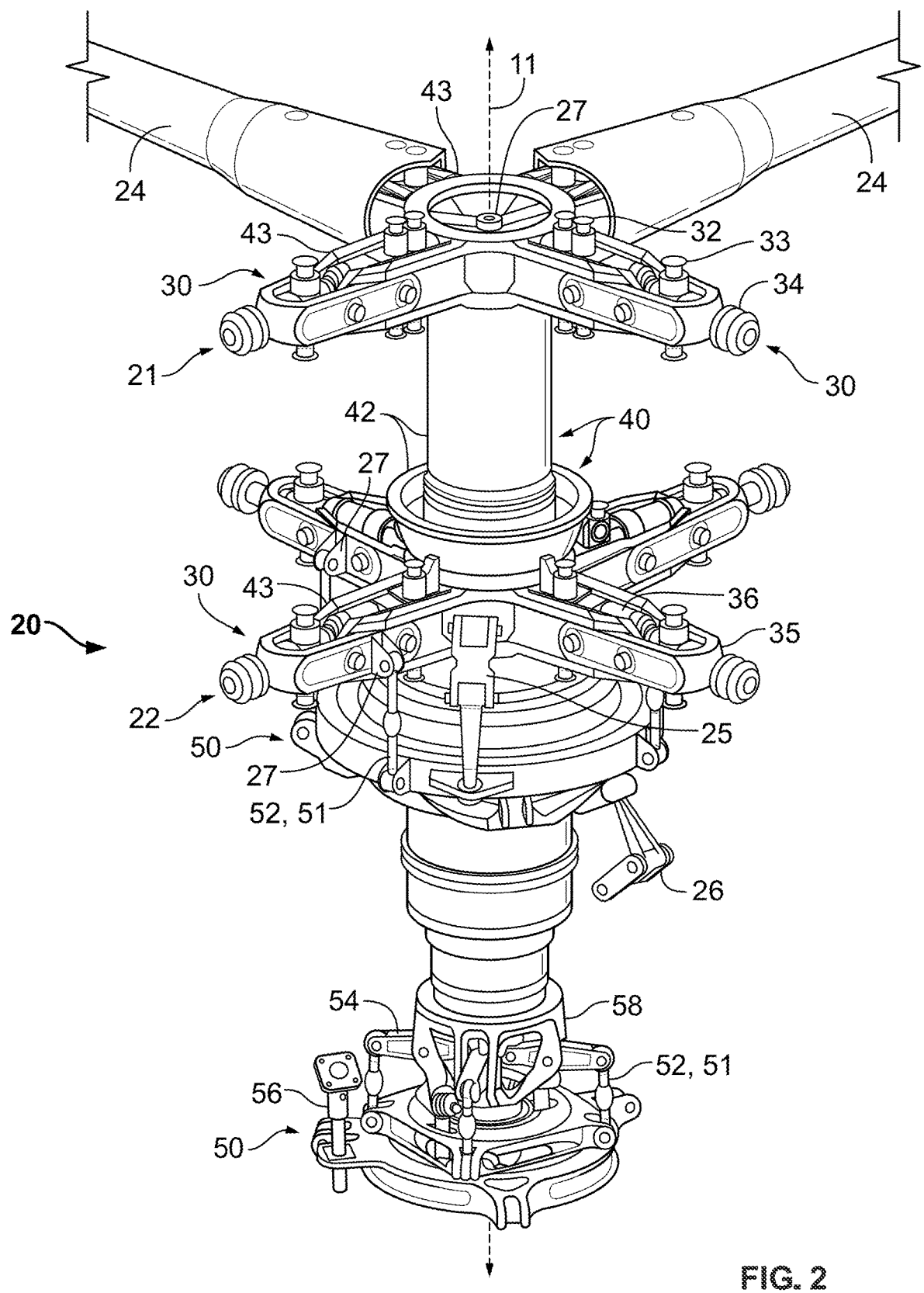
FIG. 2 is a perspective view of a rotor system of the aircraft of FIG. 1A.

The main rotor system 20 is driven by the transmission 16 and rotates about a central hub or rotor axis 11, as shown in FIG. 1B. According to various embodiments as shown in FIGS. 1A-1B, the main rotor system 20 may be a coaxial rotor system that includes an upper rotor assembly 21 and a lower rotor assembly 22 as dual counter-rotating main rotors in a coaxial configuration. The upper rotor assembly 21 is positioned above the lower rotor assembly 22. The upper rotor assembly 21 and the lower rotor assembly 22 are rotated about the same, single axis (i.e., the rotor axis 11) and may include concentric hub shafts or masts. As shown in FIG. 2, each of the upper rotor assembly 21 and the lower rotor assembly 22 includes a plurality of rotor pitch horns 27, corresponding to and for each rotor blade 24. The rotor pitch horn 27 of the lower rotor assembly 22 may be directly attached to the corresponding blade 24 and the corresponding pitch control rod assembly 52.

According to various embodiments, a computer or microcomputer is provided with a processor and a memory and is configured to carry out a control to send a command to cause the rotor system 20 to control the upper rotor assembly 21 and the lower rotor assembly 22, in particular to rotate the upper rotor assembly 21 and the lower rotor assembly 22 in opposite directions and to control the timing of rotation to cancel out the net torque on the other rotor assembly in real-time, thereby providing a net-zero torque about the airframe 14, increasing the stability of the aircraft 10, and increasing the hovering capabilities of the aircraft 10. However, according to various other embodiments, the main rotor system 20 may not be coaxial and may only include one rotor assembly.

As described further herein and shown in FIG. 2, the rotor system 20 includes a rotor swashplate assembly 50 for each rotor assembly. The lowermost swashplate assembly 50 corresponds to the upper rotor assembly 21, and the uppermost swashplate assembly 50 corresponds to the lower rotor assembly 22. As shown in FIG. 2, the rotor system 20 further includes a rotating scissor 25 and a stationary scissor 26.

The main rotor system 20 (in particular, each of the upper rotor assembly 21 and the lower rotor assembly 22) includes a set or plurality of main rotor blades 24 (e.g., a rotor blade spar), a plurality or set of corresponding of extension assemblies 30 (as shown in FIG. 2 and corresponding to each of the rotor blades 24), and at least one central rotor hub 40 (as described further herein) to which each of the rotor blades 24 and/or the extension assemblies 30 is attached. The rotor system 20 is configured to rotate about the rotor axis 11 (thereby rotating the rotor blades 24 about the rotor axis 11), and the upper rotor assembly 21 or the lower rotor assembly 22 is mounted to a respective one of the rotor hubs 40.

The translational thrust system 18 provides translational thrust generally parallel to an aircraft longitudinal axis 12 (that extends along the length of the aircraft 10). The translational thrust system 18 may be selected from one of a plurality of propeller systems including, but not limited to a pusher propeller, a tractor propeller, a nacelle mounted propeller, etc. In the example of FIGS. 1A-1B, the translational thrust system 18 includes an auxiliary propulsor 19. In an embodiment, the auxiliary propulsor 19 is a pusher propeller system with a propeller rotational axis oriented substantially horizontal and parallel to the aircraft longitudinal axis 12 to provide thrust for high speed flight. The translational thrust system 18 may be driven through a main gearbox 17, which also drives the main rotor system 20.

The transmission 16 includes the main gearbox 17 driven by the one or more engines 15. The main gearbox 17 and the engines 15 may be mounted on the airframe 14 of the aircraft 10. Thus, the main gearbox 17 and engines 15 form part of the overall assembly including airframe 14. In the case of a rotary wing aircraft, the main gearbox 17 may be interposed between the one or more engines 15, the main rotor system 20, and the translational thrust system 18. In one embodiment, the main gearbox 17 is a split torque gearbox which carries torque from the engines 15 through a multitude of drivetrain paths.

Although a particular rotary wing aircraft configuration is illustrated and described in the disclosed non-limiting embodiment, other configurations and/or machines with rotor systems are within the scope of the present disclosure. It is to be appreciated that while the description herein relates to a rotary wing aircraft with a dual coaxial counter-rotating rotor system, the disclosure herein may be as readily applied to other rotor systems, such as turboprops, tilt-rotors, and tilt-wing aircraft, or a conventional single rotor system.

Rotor Blade

The rotor system 20 (in particular each of the rotor assemblies 21, 22) may include any number of rotor blades 24, such as three or four rotor blades 24, that rotate with the rotor hub 40 and the corresponding extension assembly 30, about the rotor axis 11. Each of the rotor blades 24 is directly mounted or attached to a respective rotor hub 40 of the rotor assembly 21, 22 (via the hub projections 43) and/or to a respective extension assembly 30. At least a portion of the rotor blade 24 extends radially outwardly from the corresponding extension assembly 30 and the set of hub projections 43. The rotor blades 24 are circumferentially spaced apart from each other about the respective rotor hub 40. Although the extension assemblies 30 and the rotor hub 40 are shown herein with the main rotor blades 24, according to various other embodiments, the extension assemblies 30 and the rotor hub 40 may be used with other types of rotor blades.

The longitudinal, pitch, or feathering axis of the rotor blade 24 refers to the axis about which the pitch angle of the rotor blade 24 is varied (via the swashplate assembly 50, as described further herein) and the direction of centrifugal force of the rotor blade 24. In particular, the rotor blade 24 pitches, rotates, feathers, or twists about its feathering axis about at least one bearing assembly 32, 33, 34 of the extension assembly 30 to change the pitch angle, which changes the lift and drag. By increasing the pitch angle, the rotor blade 24 provides more lift. Conversely, by decreasing the pitch angle, the rotor blade 24 provides less lift. The feathering axis extends substantially perpendicular to the rotor axis 11.

Central Rotor Hub

The central rotor hub 40 (e.g., a hub body) is configured to rotate about and define the rotor axis 11 (thereby rotating the rotor blades 24 and the extension assemblies 30 about the rotor axis 11), and the rotor blades 24 and the extension assemblies 30 are mounted to the rotor hub 40. As shown in FIG. 2, each of the rotor hubs 40 includes a hub mast 42 and a plurality of hub attachment sites or portions (e.g., hub extensions or projections 43).

The rotor hub shaft or mast 42 extends upwardly along and around the rotor axis 11 and is rotated about the rotor axis 11 relative to the airframe 14 to rotate the rest of the rotor hub 40 (and thus the rotor blades 24 and the extension assemblies 30) about the rotor axis 11.

As shown in FIG. 2, each of the hub projections 43 (which may be configured as sets of projections) corresponds to one of the extension assemblies 30 and the corresponding one of the rotor blades 24. The projections 43 extend at least partially into an inner area of the rotor blades 24. The hub projections 43 provide an area along the rotor hub 40 for each of the extension assemblies 30 to attach or mount to. Each of the hub projections 43 extends radially outwardly from an outer surface and perimeter of the hub mast 42 and are positioned about an outer circumference of the hub mast 42 (circumferentially spaced apart from each other about the hub mast 42).

Extension Assembly

Each of the extension assemblies 30 correspond to and are configured to directly mounted, fastened, or attached to a respective one of the rotor blades 24 and to the rotor hub 40 (specifically to a corresponding one of the hub projections 43 of the rotor hub 40), thereby attaching one of the rotor blades 24 to the rotor hub 40). Each of the extension assemblies 30 are positioned at least partially in the inner area of the rotor blades 24. Since the rotor system 20 (in particular each of the rotor assemblies 21, 22) may include any number of rotor blades 24, the rotor system 20 includes the same number of extension assemblies 30 and rotor blades 24, such that each rotor blade 24 has a corresponding extension assembly 30. The extension assembly 30 (and thus also the corresponding rotor blade 24) rotates with the rotor hub 40 about the rotor axis 11.

The extension assemblies 30 are circumferentially spaced apart from each other about the rotor hub 40 (and radially and tangentially aligned with a corresponding one of the rotor blades 24 and a corresponding one of the hub projections 43). Each extension assembly 30 extends radially outwardly from the rotor hub 40.

Each of the extension assemblies 30 includes a plurality of bearing assemblies 32, 33, 34 to stabilize the motion of the rotor blades 24 and to permit a pitching motion of the rotor blade 24. According to one embodiment, each of the extension assemblies 30 includes three elastomeric bearing blocks or assemblies (i.e., an inboard pitch bearing assembly 32, a centrifugal bearing assembly 33, and an outboard pitch bearing assembly 34). The bearing assemblies 32, 33, 34 may be at least partially positioned, housed, or contained within the inner area of and directly attached to the rotor blade 24.

As shown in FIG. 2, each of the extension assemblies 30 includes a loop beam 35 that attaches to opposite sides of a set of hub projections 43 and extends around the inboard pitch bearing assembly 32 and the centrifugal bearing assembly 33 (while the outboard pitch bearing assembly 34 is attached to an outside of the loop beam 35). Each of the extension assemblies 30 includes a composite shear tie 36 that is positioned radially between the inboard pitch bearing assembly 32 and the centrifugal bearing assembly 33.

Swashplate Assembly

Figure 3A:
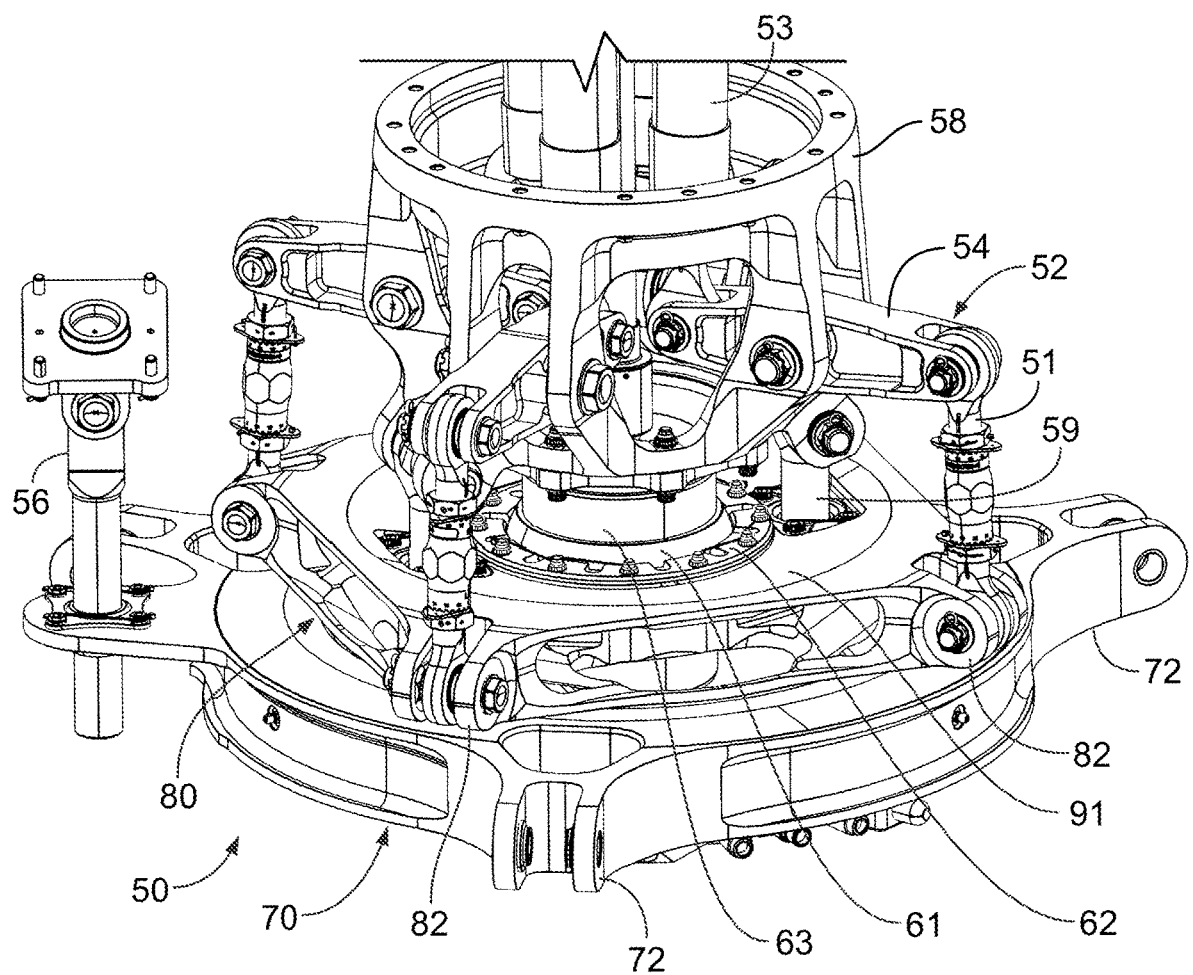
FIG. 3A is a perspective view of a portion of the rotor system of FIG. 2.
Figure 3B:
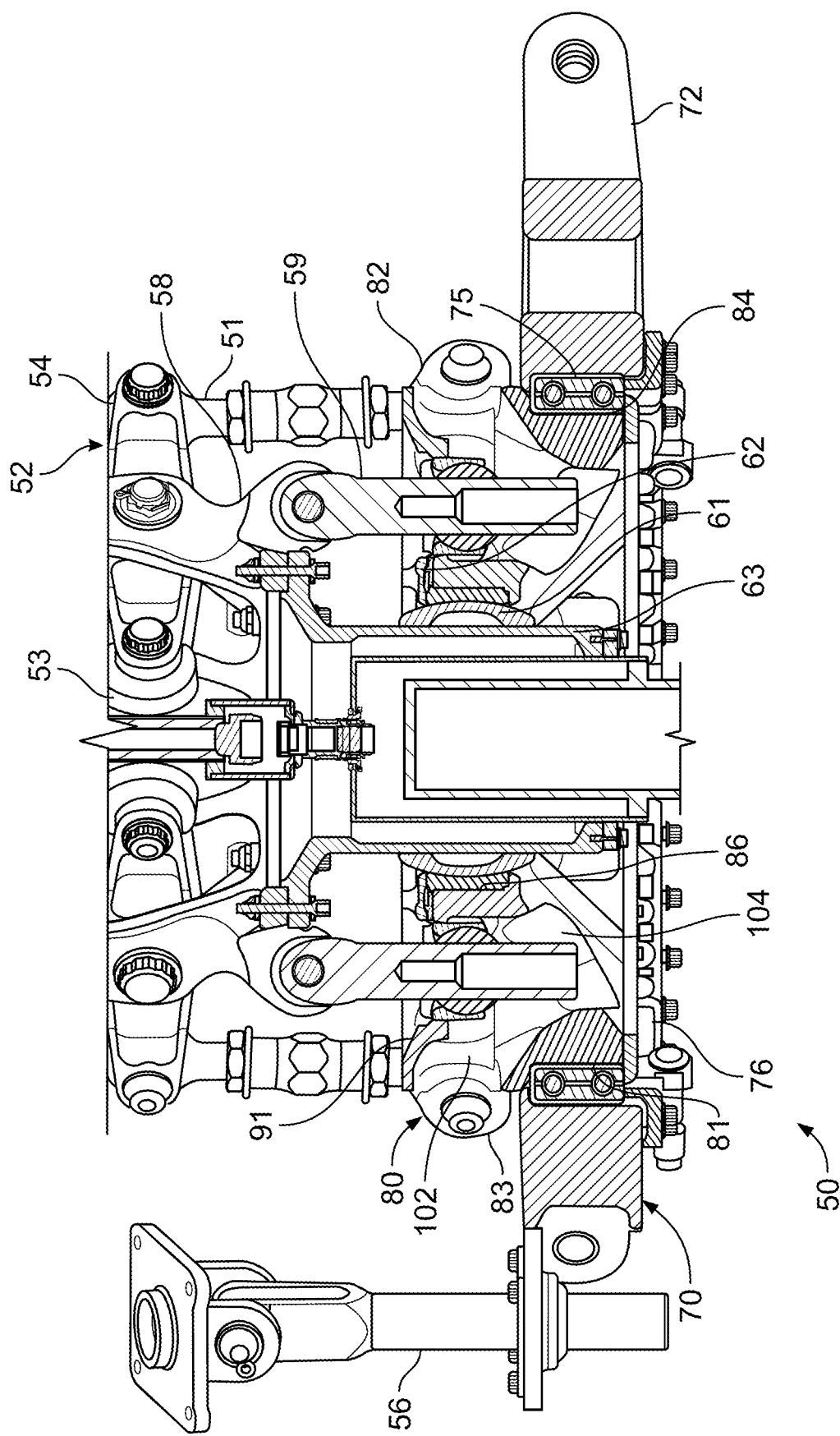
FIG. 3B is a cross-sectional view of FIG. 3A.

Each of the swashplate assemblies 50 (for the upper rotor assembly 21 and the lower rotor assembly 22) include various mechanical control system components used in cyclic rotor systems 20 to adjust the angles of the rotor blades 24. The swashplate assembly 50 is positionable around a shaft (such as the lower shaft 63) and is connectable to the pitch control rod assembly 52. As shown in FIG. 3A, the swashplate assembly 50 comprises a stationary swashplate 70, a rotatable swashplate 80, at least one pitch control rod assembly 52 (preferably a plurality of pitch control rod assemblies 52, each corresponding to one of the blades 24), a stationary index link 56, and various other rotatable components. The various other rotatable components include, but are not limited to, a pivot housing 58, at least one rotatable index link 59, an inner bearing assembly (e.g., a uniball bearing 61), a uniball bearing retainer 62, a lower hub, mast, or shaft 63, and a portion of the duplex bearing retainer 76. As shown in FIG. 3B, the swashplate assembly 50 further comprises an outer bearing assembly (e.g., a duplex bearing 75) positioned radially between the stationary swashplate 70 and the rotatable swashplate 80 and rotatably attaching the stationary swashplate 70 and the rotatable swashplate 80 together. The rotatable swashplate 80, the pitch control rod assemblies 52, a portion of the duplex bearing 75, and the rest of the rotatable components all rotate with the rotor hub 40, relative to the stationary swashplate 70, the stationary index link 56, the rest of the duplex bearing 75 and the rest of the duplex bearing retainer 76.

The swashplate assembly 50 is configured to transmit inputs or commands from the rest of the aircraft 12 (e.g., from the pilot of the aircraft 12) into blade pitch changes, in particular by translating motion from the stationary swashplate 70 to the rotatable swashplate 80 (and subsequently to the rotor blades 24). For example, servo motion, which is a function of pilot stick motion, is input at the lugs 72 of the stationary swashplate 70 in the form of a load. This load is translated through the duplex bearing 75 to the rotatable swashplate 80, which transmits the load through its lugs 82 to the pitch control rod assemblies 52, the rotor pitch horns 27, and subsequently to the rotor blades 24. Accordingly, the load transmitted through the rotatable swashplate 80 is used to impart pitch angle changes on each of the blades 24.

To adjust the rotor blades 24 and control the motion of the aircraft 10, a pilot can move cylic- and collective-pitch levers to manipulate the swashplate assembly 50 (and thus the rotor blade 24). For example, when the pilot moves the cyclic-pitch levers, the swashplate assembly 50 changes the angle of the blades 24 individually as they revolve. This allows the aircraft 10 to move in any direction around a 360-degree circle, including forward, backward, left, and right. When the pilot moves the collective-pitch levers, the swashplate assembly 50 changes the angle of all blades 24 simultaneously, which increases or decreases the lift supplied to the aircraft 10, allowing the aircraft 10 to gain or lose altitude.

Additionally, the swashplate assembly 50 is a structural member that is configured to react to thrust and restrain moment reactions and loads transferred from the blades 24 through the corresponding pitch control rods 52. This load is then transferred through to the rotatable swashplate 80 (via the lugs 82) and into the stationary swashplate 70 via the duplex bearing 75.

To reach a control rod radial station (i.e., the pitch control rod assemblies 52), the stationary swashplate 70 and the rotatable swashplate 80 have a relatively large diameter and therefore may comprise a substantial portion of the overall weight of the rotor system 20. However, as described further herein, the particular configuration of the rotatable swashplate 80 allows the rotatable swashplate 80 to have a significantly reduced weight (compared to conventional rotatable swashplates), while achieving a robust design having structural integrity.

As shown in FIG. 3B, the duplex bearing 75 is positioned radially between the rotatable swashplate 80 and the stationary swashplate 70 and is configured to allow the rotatable swashplate 80 to rotate freely relative to the stationary swashplate 70, while transmitting forces between the rotatable swashplate 80 and the stationary swashplate 70 (to, for example, manipulate the blades 24). As shown, the rotatable swashplate 80 (in particular the lower portion 81) is positioned partially within and circumferentially surrounded by the stationary swashplate 70. Accordingly, the duplex bearing 75 extends circumferentially around an outer circumference of the lower portion 81 of the rotatable swashplate 80 and within an inner circumference of the stationary swashplate 70. However, according another embodiment, the stationary swashplate 70 is instead positioned partially within and circumferentially surrounded by the rotatable swashplate 80, such that the duplex bearing 75 instead extends circumferentially around an outer circumference of the stationary swashplate 70 and within an inner circumference of the rotatable swashplate 80. Accordingly, depending on the configuration, either the stationary swashplate 70 or the rotatable swashplate 80 may include a bearing race diameter.

Figure 3C:
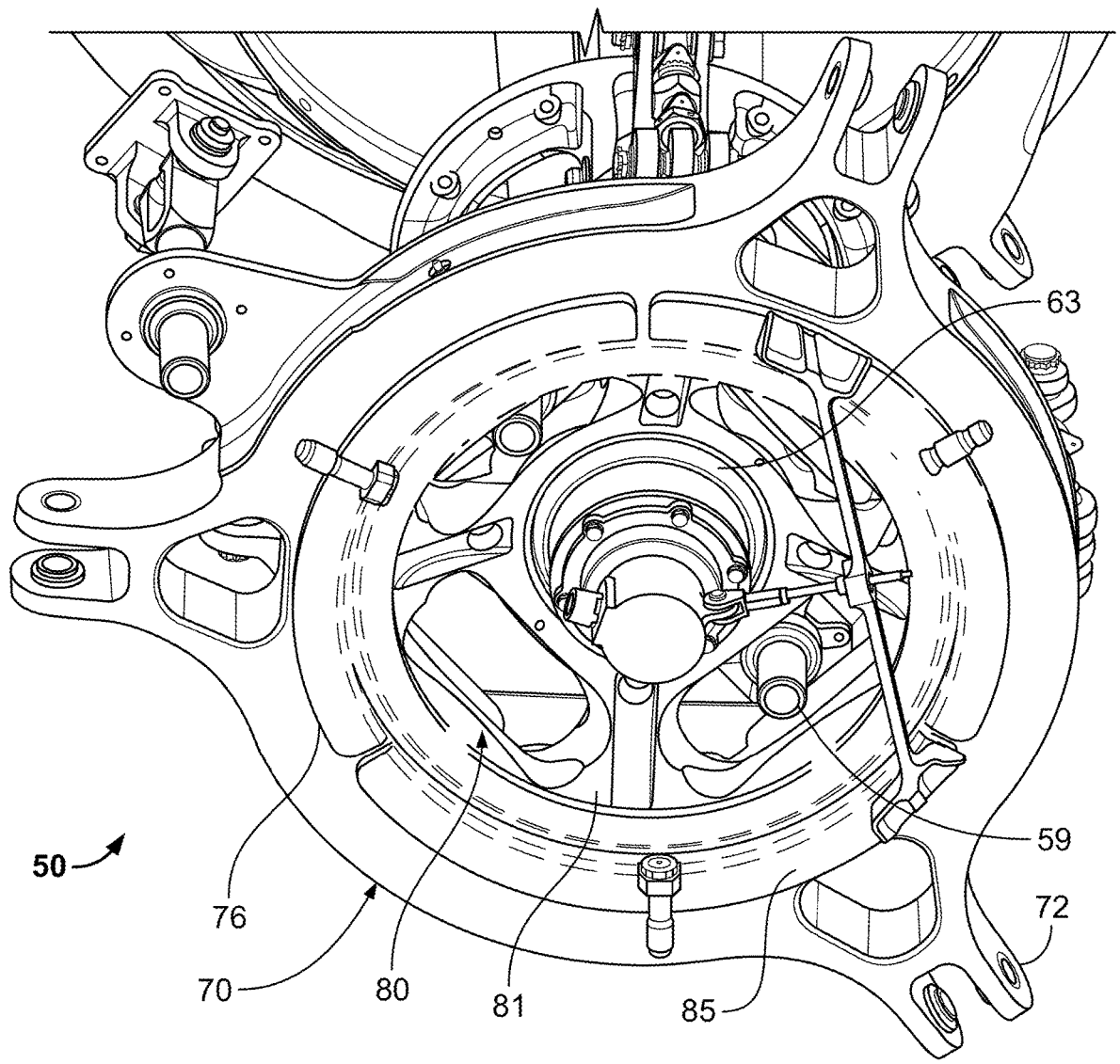
FIG. 3C is a bottom perspective view of FIG. 3A.

As shown in FIGS. 3B-3C, the duplex bearing retainer 76 extends circumferentially around axial bottom portions of each of the stationary swashplate 70, the duplex bearing 75, and the rotatable swashplate 80 to keep the duplex bearing 75 in place. An inner portion and an outer portion of the duplex bearing retainer 76 are each attached to the rotatable swashplate 80 and the stationary swashplate 70, respectively, with fasteners (e.g., bolts).

Each of the pitch control rod assemblies 52 provides a physical linkage between the rotatable swashplate 80 and a corresponding one of the rotor pitch horns 27 corresponding to each of the blades 24, thereby transmitting or transferring motion or forces between the rotatable swashplate 80 (and thus the stationary swashplate 70) and the blade 24. Accordingly, each of the pitch control rod assemblies 52 allow the rotatable swashplate 80 to change the pitch of the rotor blade 24 (via the lugs 82). The pitch control rod assemblies 52 can push and pull the rotatable swashplate 80 (also via the lugs 82), depending on the direction of force. The swashplate assembly 50 includes a pitch control rod assembly 52 for each of the blades 24.

According to one embodiment, each of the pitch control rod assemblies 52 may comprise only one short pitch control rod 51 (as shown with the pitch control rod assembly 52 (that is for the lower rotor assembly 22) in FIG. 2). Accordingly, the short pitch control rods 51 extends directly between and connects the lugs 82 of the rotatable swashplate 80 and the rotor pitch horn 27.

According to another embodiment, each of the pitch control rod assemblies 52 may comprise a plurality of different elements that are movable relative to each other and linked together (as shown with the pitch control rod assembly 52 (that is for the upper rotor assembly 21) in FIG. 3A). For example, each of the pitch control rod assemblies 52 may include a short pitch control rod 51, a walking beam 54, and a long pitch control rod 53.

The short pitch control rod 51 is positioned completely outside the hub mast 42 and extends directly between, connects, and transfers movement between the lugs 82 of the rotatable swashplate 80 and the walking beam 54. In particular, the bottom portion of the short pitch control rod 51 is attached or fastened to the lugs 82 of the rotatable swashplate 80, and the top portion of the short pitch control rod 51 is attached or fastened to a radially-outer end of the walking beam 54.

The rocker link or walking beam 54 extends directly between, connects, and transfers movement between the short pitch control rod 51 and the long pitch control rod 53. A radially-outer end of the walking beam 54 is attached or fastened to the top portion of the short pitch control rod 51, and a radially-inner end of the walking beam 54 is attached or fastened to a bottom portion of the long pitch control rod 53. Accordingly, the long pitch control rod 53 is positioned radially inward from the short pitch control rod 51.

The long pitch control rod 53 is positioned at least partially inside the hub mast 42 and extends directly between, connects, and transfers movement between the walking beam 54 and the rotor pitch horn 27. The bottom portion of the long pitch control rod 53 is attached or fastened to the radially-inner end of the walking bean, and the top portion of the long pitch control rod 53 is attached or fastened to the rotor pitch horn 27 for one of the blades 24.

As shown in FIGS. 3A-3B, the pivot housing 58 extends circumferentially around the bottom portions of the long pitch control rods 53 and includes a plurality of openings through which the walking beams 54 extend into. The short pitch control rods 51 are positioned radially outside of the pivot housing 58.

As shown in FIG. 3B, the rotatable index links 59 each extend axially between and connect a bottom portion of the pivot housing 58 and an inner area of the rotatable swashplate 80. The rotatable index links 59 are positioned radially between an outermost wall 84 and an innermost wall 86 of the rotatable swashplate 80 (as described further herein). The rotatable index links 59 are configured to keep the pivot housing 58 in place relative to the rotatable swashplate 80 and to stabilize the rotatable swashplate 80 about the lower shaft 63.

As shown in FIGS. 3A-3B, the uniball bearing 61 and the lower shaft 63 are positioned within the innermost area of the rotatable swashplate 80 (in particular within and circumferentially surrounded by the innermost wall 86 of the rotatable swashplate 80). The uniball bearing 61 is positioned circumferentially around the lower shaft 63 such that the lower shaft 63 can angularly move relative to the rotatable swashplate 80. Accordingly, the rotatable swashplate 80 and the lower shaft 63 are rotatable and twistable relative to each other via the uniball bearing 61. A top portion of the lower shaft 63 is secured to a bottom portion of the pivot housing 58 (which may be secured to the (upper) hub mast 42. The uniball bearing 61 may abut or be retained by the innermost surface of the innermost wall 86.

The uniball bearing retainer 62 extends circumferentially around a top axial portion of the uniball bearing 61 (and a portion of the top surface of the rotatable swashplate 80) to keep the uniball bearing 61 axially in place. A portion of the uniball bearing retainer 62 is attached to the rotatable swashplate 80 with fasteners (e.g., bolts).

The stationary swashplate 70 is fixed to the airframe 14, such that the rotor hub 40 can rotate relative to the stationary swashplate 70. Accordingly, the stationary swashplate 70 does not rotate with the rotor hub 40 (or the rotatable swashplate 80). Various control rods may be attached to the stationary swashplate 70. These control rods are also attached to cylic- and collective-pitch levers. Accordingly, when the pilot operates the cylic- and/or collective-pitch levers, the inputs are transmitted (via the control rods) to the stationary swashplate 70 (via the lugs 72), which transmits the inputs to the rotatable swashplate 80 and thus to the blades 24. The stationary swashplate 70 may have a variety of different configurations, depending on the desired overall configuration of the swashplate assembly 50.

The stationary swashplate 70 comprises a plurality of (preferably four) lugs 72 spaced about the outer perimeter of the stationary swashplate 70. The lugs 72 provide areas to attach to various levers to be controlled by the pilot and allow force to be transmitted to and from the stationary swashplate 70.

The stationary index link 56 is secured to an outer portion of the stationary swashplate 70 and is configured to keep the stationary swashplate 70 in position and prevent the stationary swashplate 70 from rotating (with the rotatable swashplate 80, for example).

As shown in FIGS. 3A-3B, the stationary swashplate 70 and the rotatable swashplate 80 have a stacked configuration in which the rotatable swashplate 80 is positioned both within an inner area of the stationary swashplate 70 (i.e., the lower portion 81) and axially above the stationary swashplate 70 (i.e., the upper portion 83). Although the inner swashplate is shown and described as the rotatable swashplate 80 and the outer swashplate is shown and described as the stationary swashplate 70, the inner swashplate may alternatively be the stationary swashplate 70, and the outer swashplate may alternatively be the rotatable swashplate 80.

Rotatable Swashplate

The rotatable swashplate 80 is connected to and rotates with the rotor hub 40, relative to the stationary swashplate 70 and around the shaft (such as the lower shaft 63). The rotatable swashplate 80 is connectable to the pitch control rod assembly 52. The particular configuration of the rotatable swashplate 80 allows the rotatable swashplate 80 to have a uniquely weight-efficient design (compared to conventional rotatable swashplates) that distributes mass and mechanical support to exactly where it is needed. The rotatable swashplate 80 according to some embodiments reduces by as much as 30% the component weight (compared to conventional rotatable swashplates), while preserving the stress and stiffness attributes. The rotatable swashplate 80 may be constructed as a single, integral, unitary piece or component that cannot be separated without destruction.

As described further herein, the configuration of the rotatable swashplate 80 includes additional material in particular areas to form various support structures (e.g., the membrane 91, the extensions 96, and the thick sections 84a, as described further herein) to most effectively to maximize stiffness and create a structurally-efficient, multi-level rotatable swashplate 80. As described further herein, the membrane 91 is positioned along an upper axial end of the rotatable swashplate 80, the extensions 96 extends along a middle axial portion of the rotatable swashplate 80, and the thick sections 84a are positioned along a lower axial end of the rotatable swashplate 80. Accordingly, the rotatable swashplate 80 has multi-level support structures that act in parallel along the axial height of the rotatable swashplate 80. The rotatable swashplate 80 also selectively does not include material in other particular areas (without sacrificing the stiffness), including but not limited to the radially-extending pockets 102, the axially-extending pockets 104, and the tangentially-extending through-holes 108 (as described further herein), to reduce weight. The various features of the rotatable swashplate 80 are combined to make the manufacturing more efficient.

Comparatively, in conventional rotatable swashplates, material is removed only where convenient during manufacturing. Since the various features of the conventional rotatable swashplates are separately formed from each other, removing more material would otherwise sacrifice the efficiency during manufacturing. Accordingly, conventional rotatable swashplates include more material (and thus more weight).

The various support structures provide stiffness and support for forces transmitted to and from the rotatable swashplate 80 via the pitch control rod assemblies 52 (at the lugs 82), the duplex bearing 75, the duplex bearing retainer 76 (at the duplex bearing retainer holes 85), the uniball bearing 61, the uniball bearing retainer holes 87), and the rotatable index link 59 (at the index link holes 94). The various portions of material that have been removed allow the rotatable swashplate 80 to weigh less or for clearance.

Figure 9A:
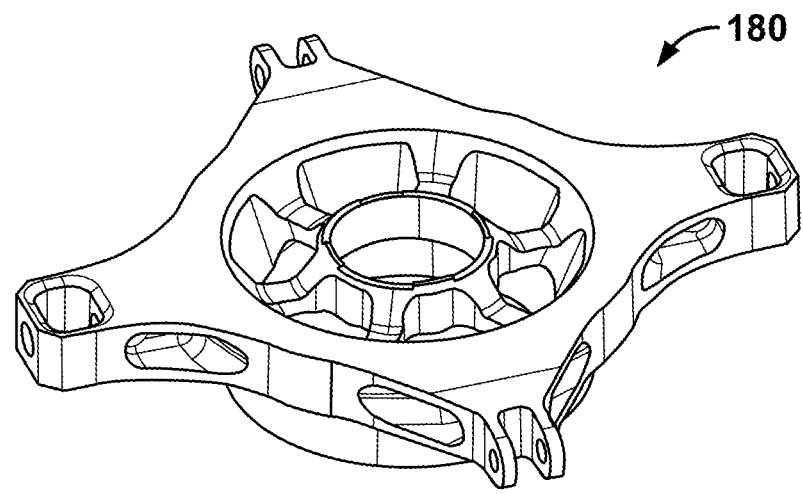
FIGS. 9A-9B are top and bottom perspective views of a conventional rotatable swashplate.
Figure 9B:
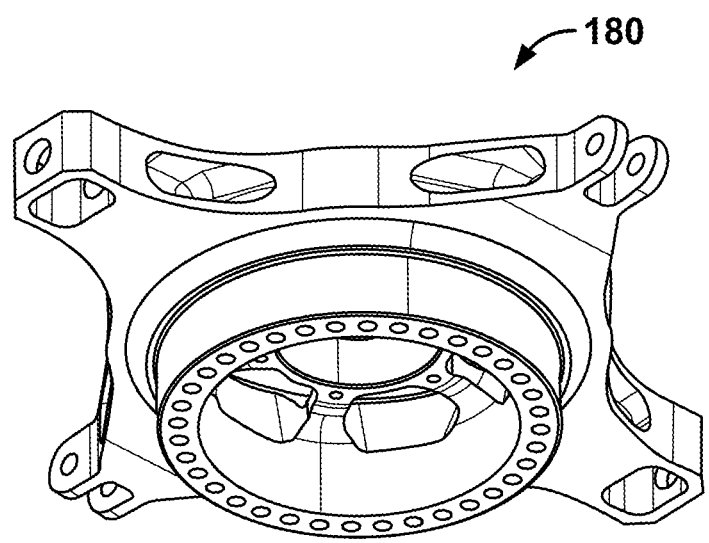
Figure 10:
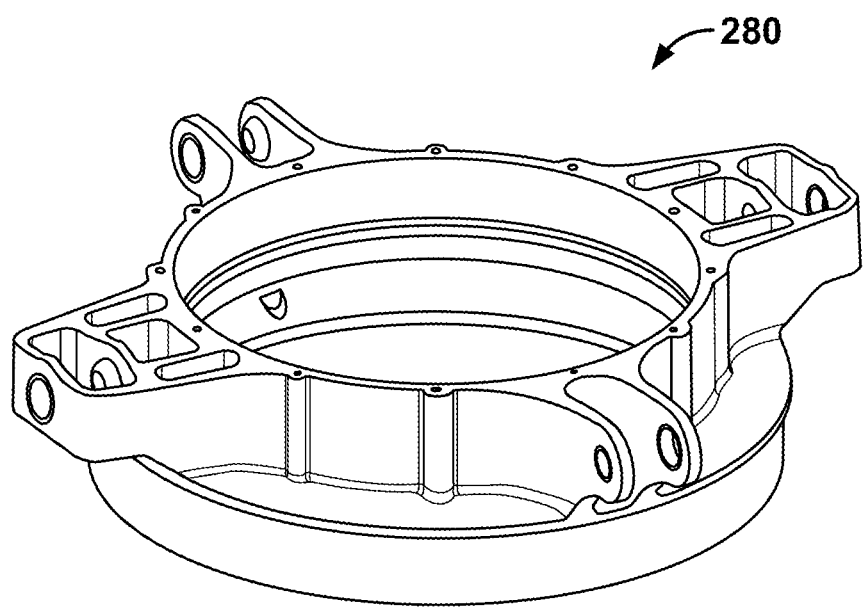
FIG. 10 is a top perspective view of a conventional rotatable swashplate.

The various support structures (e.g., the membrane 91, the extensions 96, and the thick sections 84a) of the rotatable swashplate 80 may be formed in parallel with each other, with shared material in between. This reduces the amount of transitional material needed between support structures, adds an additional structural dimension with a more efficient cross-sectional distribution, and minimizes the amount of material near the neutral bending axis (in a similar manner to the flanges of an I-beam) to reduce the overall weight. Comparatively, as shown in FIGS. 9A-9B, the various support structures within the conventional rotatable swashplate 180 are formed radially in series with each other, rather than in parallel. As shown in FIG. 10, the conventional rotatable swashplate 280 has a bulky outer hoop that contains the majority of the mass of the component.

Figure 4A:
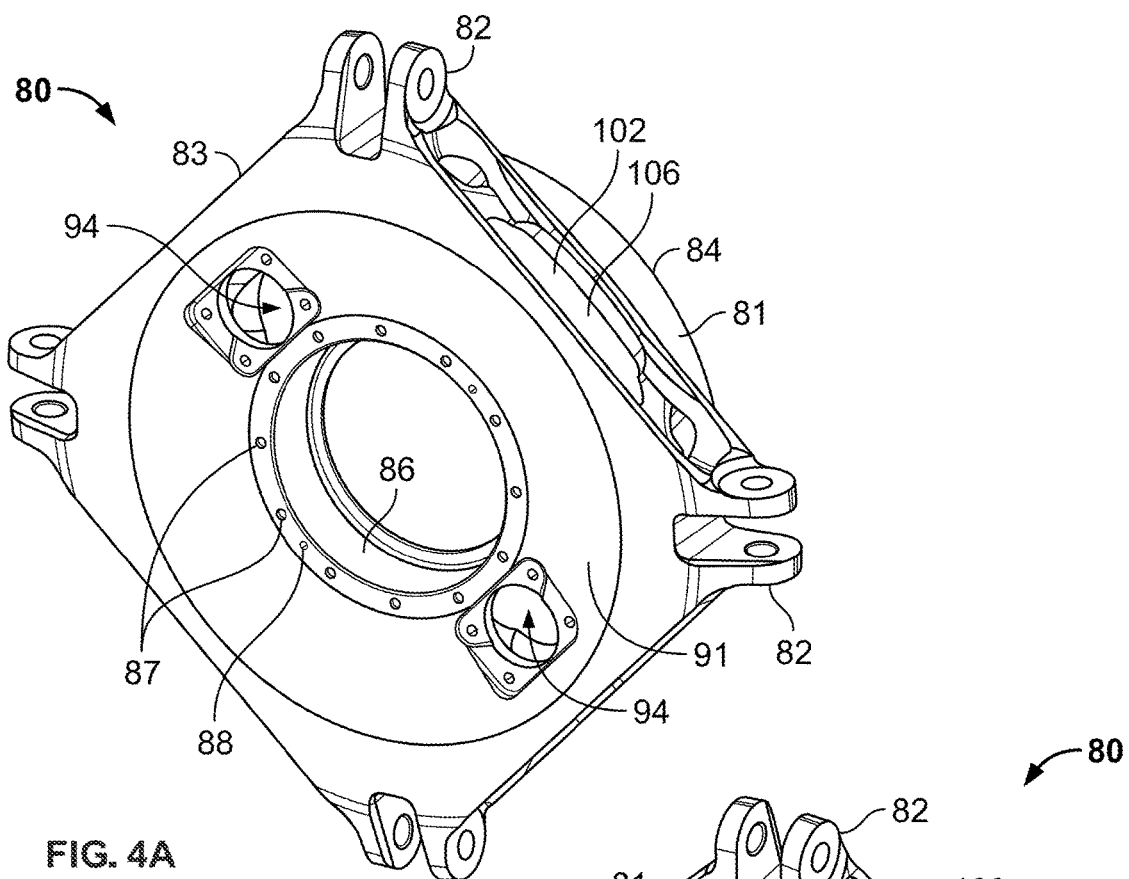
FIG. 4A is a top perspective view of a rotatable swashplate of a swashplate assembly of the rotor system of FIG. 2.
Figure 4B:
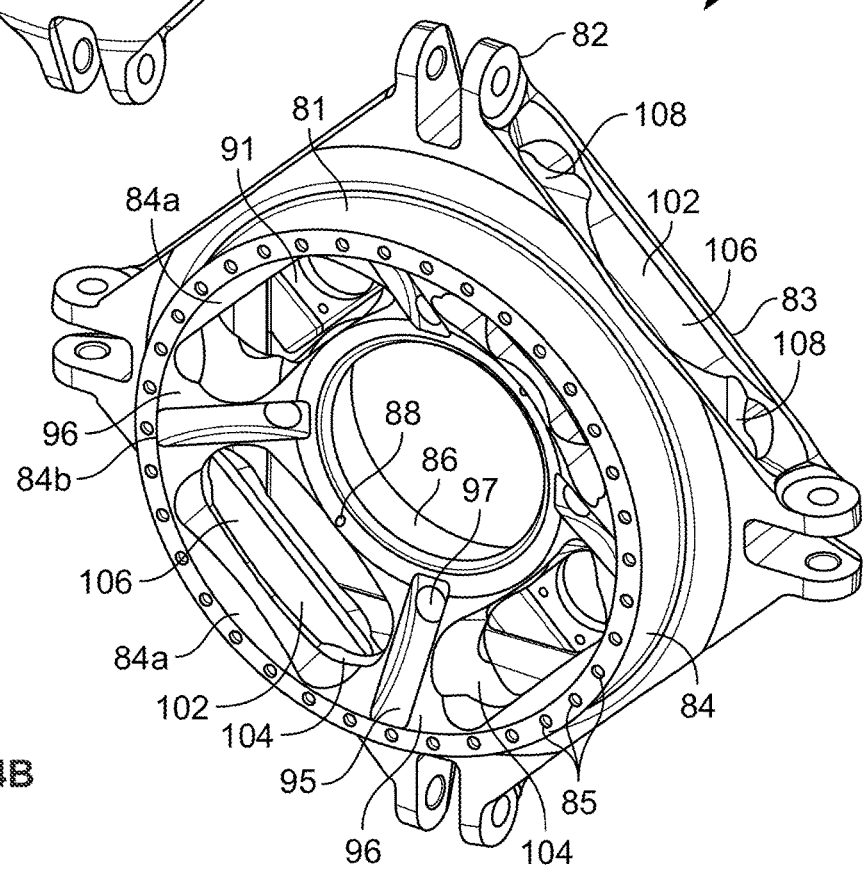
FIG. 4B is a bottom perspective view of the rotatable swashplate of FIG. 4A.
Figure 4C:
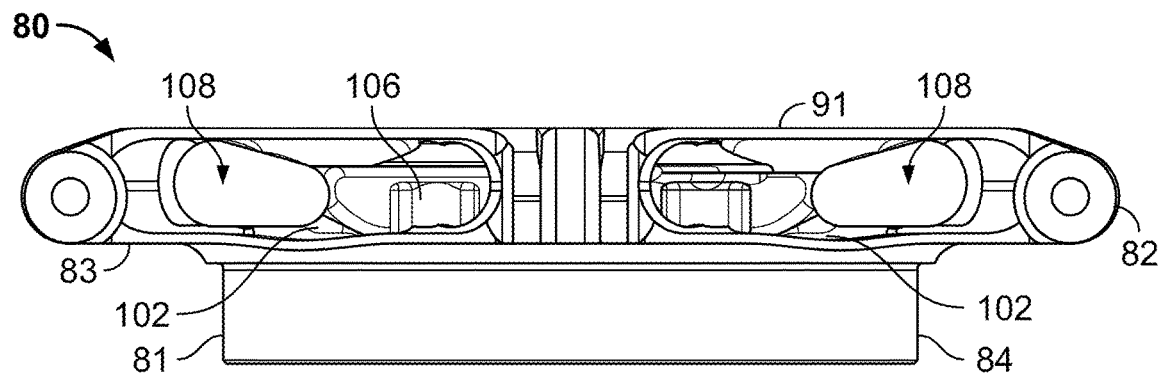
FIG. 4C is a side view of the rotatable swashplate of FIG. 4A.

As shown in FIGS. 3B and 4C, the rotatable swashplate 80 comprises a lower portion 81 and an upper portion 83. As shown in FIG. 3B, the lower portion 81 is configured to be inserted into, positioned within, and circumferentially or radially surrounded by the duplex bearing 75 and the stationary swashplate 70, and the upper portion 83 is configured to extend outside of and axially above the duplex bearing 75 and the stationary swashplate 70 when the rotatable swashplate 80 and the stationary swashplate 70 are assembled and attached together.

As shown in FIGS. 3A-3B, the rotatable swashplate 80 comprises a plurality of (preferably four) lugs 82 spaced tangentially about the outer edge or perimeter of the upper portion 83 of the rotatable swashplate 80. Each of the lugs 82 provide an area to attach to a corresponding pitch control rod assembly 52 (in particular to the bottom portion of the short pitch control rod 51) to transfer motion to (and from) the blades 24. Accordingly, the lugs 82 transfer load to and from the rotatable swashplate 80 via the pitch control rod assemblies 52. Each of the lugs 82 may include two extensions that extend radially outwardly from the outer edge of the upper portion 83, each of which defines a through-hole that is configured to receive a fastener to attach to the corresponding pitch control rod assembly 52.

As shown in FIGS. 4A-4F, the rotatable swashplate 80 comprises a circumferential, radially outermost wall 84 and a circumferential, radially innermost wall 86 (where the innermost wall 86 is positioned radially inward from the outermost wall 84). As shown in FIGS. 4E-4F, the outermost wall 84 and the innermost wall 86 extend axially along the axial height of the rotatable swashplate 80. The outermost surface of the outermost wall 84 and the innermost surface of the innermost wall 86 extend substantially axially and parallel to each other and both have a substantially round, circular shape to interface with the duplex bearing 75 and the uniball bearing 61, respectively. The outermost wall 84 and the innermost wall 86 may be axially offset from each other such that the innermost wall 86 is axially above the outermost wall 84.

As shown in FIGS. 4B-4C and 4E-4F, the lower portion 81 of the rotatable swashplate 80 comprises the axially-extending outermost wall 84. The outermost wall 84 is configured to be inserted into and circumferentially surrounded by the stationary swashplate 70 (as shown in FIG. 3B). The outermost wall 84 defines an outermost surface of the lower portion 81 that defines or provides a duplex bearing interface to interface with the inner circumference of the duplex bearing 75.

As shown in FIGS. 4B and 4F, an axial lower end of the outermost wall 84 defines a plurality of duplex bearing retainer bores or holes 85 that extend axially along a portion of the axial length of the outermost wall 84. The duplex bearing retainer holes 85 are tangentially spaced apart from each other about the entire perimeter of the outermost wall

84 along the axial lower end and are each configured to receive a fastener (that is also received by an inner portion of the duplex bearing retainer 76) to secure the duplex bearing 75 within the swashplate assembly 50. The axial lower end of the outermost wall 84 faces in a direction away from the upper portion 83 and corresponds to the axial lower end of the entire rotatable swashplate 80. The axial upper end of the outermost wall 84 faces in a direction toward the upper portion 83.

To minimize weight while maximizing stiffness, the outermost wall 84 does not have a constant thickness about its perimeter, but instead has a variable overall radial thickness about its lower perimeter, as shown in FIGS. 4B and 4D-4F. In particular, the outermost wall 84 includes a plurality of thick sections 84a (e.g., first sections) and a plurality of thin sections 84b (e.g., second sections thinner than the first sections) that are alternatively positioned about the perimeter of the outermost wall 84 and are axially aligned with each other. The thick sections 84a are radially thicker than the thin sections 84b along a same axial position. By including the thick sections 84a and the thin sections 84b, additional support is provided where needed, while extra material (and thus excess weight) is eliminated where support is not needed. Comparatively, as shown in FIG. 9B, the outermost wall of the conventional rotatable swashplate 180 (as well as the conventional rotatable swashplate 280 in FIG. 10) has a constant thickness about its entire perimeter.

The thick sections 84a and the thin sections 84b are axially aligned with each other and positioned along the bottom portion of the outermost wall 84 (i.e., axially next to the axial lower edge of the outermost wall 84 and the axial lowermost edge of the lower portion 81) and along the inner surface of the outermost wall 84. Since the thick sections 84a and the thin sections 84b are positioned along the inner perimeter of the outermost wall 84, the thickness of the outermost wall 84 varies about its inner perimeter in accordance with where additional support is or is not needed for the lugs 82.

The outermost surface of the outermost wall 84 is substantially circular and maintains a substantially constant radial distance about the inner perimeter (i.e., extends at a substantially constant radial position without variations in radial distances) from the radial center of the rotatable swashplate 80. The inner surface of the outermost wall 84 is at different radial distances about the inner perimeter (i.e., extends at different radial position along the inner perimeter of the outermost wall 84) from the radial center of the rotatable swashplate 80. The thick sections 84a may be areas in which the inner surface of the outermost wall 84 defines a substantially flat section of material (relative to the outermost surface of the outermost wall 84 and the thin sections 84b) that is radially inward from the inner surface along the thin sections 84b. The thin sections 84b may be areas in which the inner surface of the outermost wall 84 defines a substantially curved section of material relative to the thick section 84a (extending substantially parallel to the outermost surface of the outermost wall 84) that is radially outward from the inner surface along the thick sections 84a.

Figure 4D:
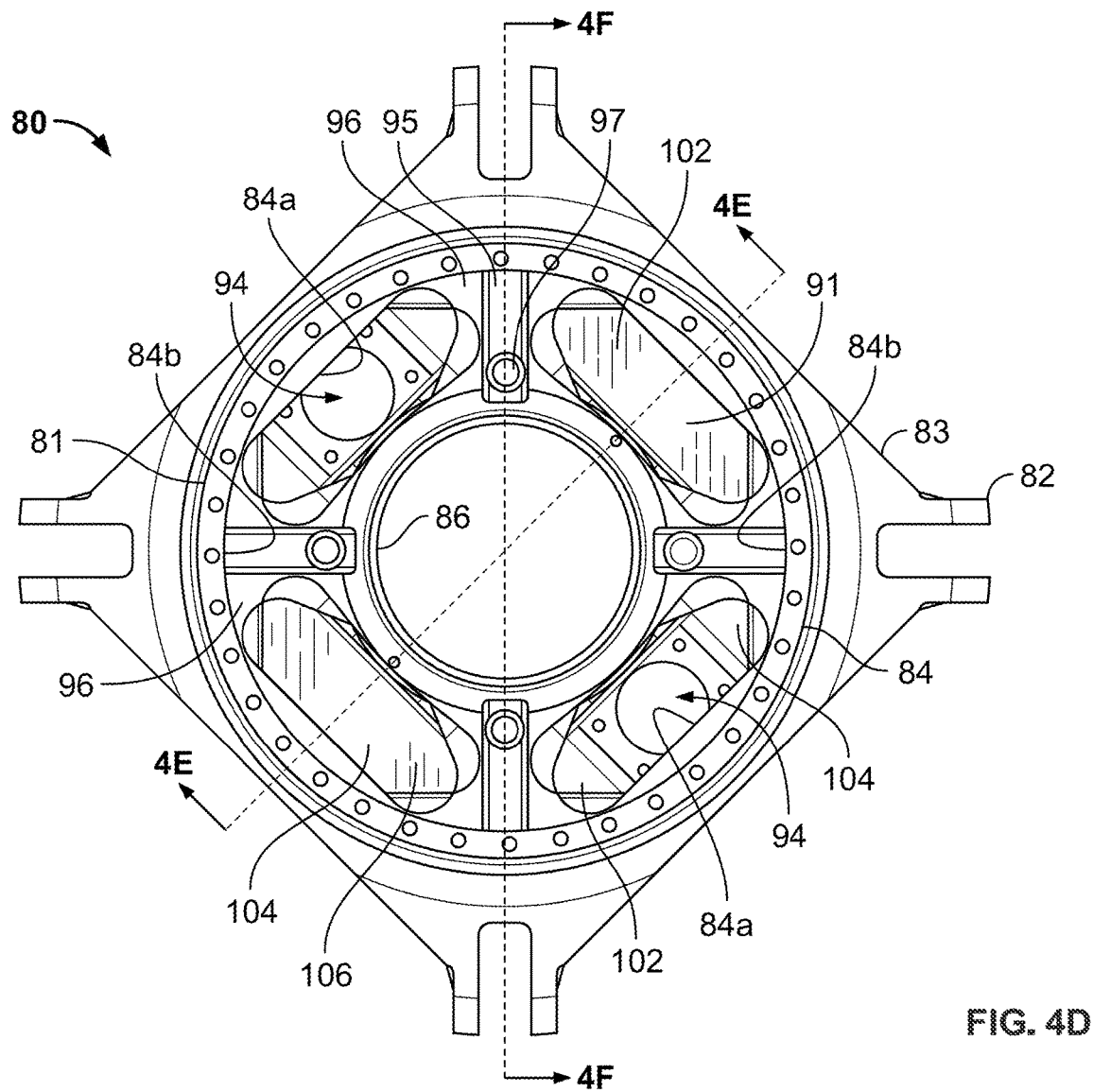
FIG. 4D is a bottom view of the rotatable swashplate of FIG. 4A.

As shown in FIG. 4D, the thick sections 84a are positioned tangentially in between the lugs 82 and the thin sections 84b and are configured to be tangential lug supports and a stiffening section for the lugs 82 and for the duplex bearing 75. The thin sections 84b are tangentially aligned with each of the lugs 82, positioned radially between the lugs 82 and the innermost wall 86. Accordingly, in an embodiment with four lugs 82 that are spaced approximately 90° apart from each other, each of the thin sections 84b are spaced approximately 90° apart from each other, and each of the thick sections 84a are spaced approximately 90° apart from each other. The middle of each of the thick sections 84a are spaced approximately 45° apart from the middle of each of the thin sections 84b (and thus the middle of each of the lugs 82).

As shown in FIGS. 4A, 4C, and 4E-4F, the upper portion 83 of the rotatable swashplate 80 comprises the axially-extending innermost wall 86. The innermost wall 86 is configured to receive and axially secure to a shaft (such as the lower shaft 63). At least a portion of the innermost wall 86 extends axially outside of the stationary swashplate 70 (as shown in FIG. 3B) when the rotatable swashplate 80 and the stationary swashplate 70 are assembled and attached together. The innermost wall 86 defines an innermost surface of the upper portion 83 that defines or provides a uniball bearing interface that is configured to interface with the outer circumference of the uniball bearing 61. The uniball bearing 61 is positioned radially within an inner area defined by the innermost wall 86 and is circumferentially surrounded by the innermost wall 86. Due to the innermost wall 86, the upper portion 83 extends axially inwards further than the outermost wall 84.

As shown in FIGS. 4A and 4F, an axial upper end of the innermost wall 86 defines a plurality of uniball bearing retainer bores or holes 87 that extend axially along a portion of the axial length of innermost wall 86. The uniball bearing retainer holes 87 are tangentially spaced apart from each other about the entire perimeter of the innermost wall 86 along the axial upper end and are configured to receive a fastener (that is also received by an outer portion of the uniball bearing retainer 62) to secure the uniball bearing 61 within the swashplate assembly 50. The axial upper end of the innermost wall 86 faces in a direction away from the lower portion 81 and corresponds to the axial upper end of the entire rotatable swashplate 80. The axial lower end of the innermost wall 86 faces in a direction toward the lower portion 81.

As shown in FIGS. 4A and 4E, the axial upper end and the axial lower end of the innermost wall 86 define at least one drain hole 88 that is a through-hole that extends axially completely through of the innermost wall 86. The innermost wall 86 may include two drain holes 88 that are spaced approximately 180° from each other. The drain hole 88 allows any fluid to drain through the rotatable swashplate 80, in particular since the upper surface of the rotatable swashplate 80 is concave.

As shown in FIGS. 4A, 4C, and 4E-4F, the upper portion 83 comprises a upper wall, top layer, or membrane 91 that extends radially between and completely covers an area between the radially outermost edge of the upper portion 83 and an axial upper end of the innermost surface of the innermost wall 86 as a solid, continuous wall, except for along and without covering at least one index link hole 94 (preferably two index link holes 94) as shown in FIG. 4A. The membrane 91 defines an axial top surface and an axial top end of the rotatable swashplate 80 (and thus of the upper portion 83) and provides stiffness along the top end of the rotatable swashplate 80, diverting the stress away from the axial center of the rotatable swashplate 80. Although the membrane 91 is positioned along and covers the upper end of the rotatable swashplate 80, the lower end of the rotatable swashplate 80 is open (without any radially-extending membrane or wall) to allow various features to be formed and/or accessed.

The membrane 91 extends radially and tangentially over and above and completely covers the extensions 96. Accordingly, as shown in FIG. 4B, the extensions 96 extend along the inner surface of the membrane 91 (where the inner surface of the membrane 91 faces axially toward the lower portion 81 and the outer surface of the membrane 91 faces axially away from the lower portion 81). Comparatively, as shown in FIGS. 9A-9B, the conventional rotatable swashplate 180 defines a number of ribs surrounded by through-holes (without any such a membrane), which creates stress concentrations within the conventional rotatable swashplate 180.

As shown in FIGS. 4E-4F, the membrane 91 is relatively thin along the axial direction, in particular due to the various pockets and holes (such as the radially-extending pockets 102, the axially-extending pockets 104, and the tangentially-extending through-holes 108, as described further herein). However, as shown in FIG. 4E, certain portions of the lower surface of the membrane 91 may be relatively thicker to provide local stiffening within the rotatable swashplate 80. The membrane 91 extends radially and tangentially over, above, and along and covers the radially-extending pockets 102, the axially-extending pockets 104, and the tangentially-extending through-holes 108.

As shown in FIGS. 4A and 4E-4F, at least a portion of the outer surface of the membrane 91 may have a concave shape or concavity (extending axially inwardly into the rotatable swashplate 80), where the outer surface of the membrane 91 faces axially away from the lower portion 81 of the rotatable swashplate 80). According to one embodiment, a round portion of the outer surface of the membrane 91 that immediately radially surrounds the innermost surface of the innermost wall 86 may have a concave shape or concavity, while the outermost portion of the outer surface of the membrane 91 (that extends along the radially outermost edge of the upper portion 83) is substantially flat. Optionally, as shown in FIG. 4F, the bottom surfaces of the extensions 96 (as described further herein) may form a concave shape or concavity such that the membrane 91, and the extensions 96 curve inwardly toward each other from opposite sides of the rotatable swashplate 80.

The index link guides or holes 94 are defined at least partially by the membrane 91 and are each configured to receive the rotatable index link 59 (as shown in FIG. 3B) that extends axially completely through the membrane 91. The index link holes 94 may optionally be through-holes that extend completely through the entire rotatable swashplate 80, as shown in FIG. 4D. For example, the index link holes 94 may be radially and tangentially aligned with the axially-extending pockets 104 (as described further herein) such that the index link holes 94 are axially-extending through-holes that extend completely through the rotatable swashplate 80. Accordingly, the rotatable index link 59 can extend any distance into and through the rotatable swashplate 80. The two index link holes 94 may be positioned approximately 180° apart from each other and each radially between the outermost edge of the upper portion 83 and the innermost surface of the innermost wall 86.

As shown in FIGS. 4B and 4D-4E, the lower portion 81 further comprises at least one rib, beam, or extension 96 that is positioned within an axial middle portion of the rotatable swashplate 80. Preferably, the lower portion 81 comprises a plurality of extensions 96 that each correspond to and are tangentially aligned with each of the lugs 82. Each of the extensions 96 are positioned radially between the corresponding lug 82 and the innermost wall 86. The extensions 96 are configured to be radial lug supports that extend radially and axially between an axial lower end of the outermost wall 84 and an axial lower end of the innermost wall 86. The extensions 96 are configured to support loads that are imparted via the lugs 82.

As shown in FIGS. 4B, 4D, and 4F, the middle of the extension 96 may optionally define a slot 95 and a notch 97 to remove and minimize any excess material of the extension 96, which further decreases weight where support is not needed. The slot 95 extends axially and radially along the length of the extension 96 between the axial lower end of the outermost wall 84 and the axial lower end of the innermost wall 86. The hole or notch 97 is positioned along the length of and extending axially into the slot 95.

Although the membrane 91 extends along the top of the innermost wall 86 (such that the membrane 91 and the extensions 96 are axially spaced apart, as shown in FIG. 4F), the membrane 91 radially and tangentially covers each of the extensions 96 and areas radially next to the extensions 96. Furthermore, as shown in FIG. 4D, the membrane 91 completely radially and tangentially covers an area (i.e., a top portion of an axially-extending pocket 104) extending tangentially between at least two of the extensions 96. With the exception of the index link holes 94, the membrane 91 completely radially and tangentially covers each of the areas extending tangentially between all of the extensions 96.

To reduce weight, selective portions of material have been removed from the rotatable swashplate 80, without compromising the structural integrity of the rotatable swashplate 80. For example, the rotatable swashplate 80 includes a plurality of radially-extending pockets 102, a plurality of axially-extending pockets 104, and a plurality of tangentially-extending through-holes 108. These various pockets 102, 104 and through-holes 108 define and form the extensions 96 and the inner surface of the membrane 91 and are all covered on their top axial side by the membrane 91. For example, as shown in FIG. 4D, each of the axially-extending pockets 104 are positioned tangentially between and define the sides of two of the extensions 96.

In particular, the upper portion 83 defines the plurality of side holes or radially-extending pockets 102. As shown in FIGS. 4A-4B, the radially-extending pockets 102 are each positioned tangentially between each of the plurality of lugs 82. As shown in FIG. 4E, the radially-extending pockets 102 extend radially between an outermost edge of the upper portion 83 and an outer surface of the innermost wall 86. The radially-extending pockets 102 extend completely through a side portion of the upper portion 83.

As shown in FIG. 4E, the upper portion 83 and the lower portion 81 together define the plurality of interior or axially-extending pockets 104. The axially-extending pockets 104 each extend axially between an inner surface of the membrane 91 and the axial lowermost edge of the lower portion 81. The axially-extending pockets 104 may only extend axially or at least a portion of the axially-extending pockets 104 may extend axially and radially at an angle (e.g., angled radially outward from the lower portion 81 to the upper portion 83). As shown in FIG. 3B, the axially-extending pockets 104 are radially and tangentially aligned with the index link holes 94, thereby providing clearance for a bottom portion of the rotatable index links 59 positioned within the index link holes 94.

The axially-extending pockets 104 are each radially and tangentially aligned with the radially-extending pockets 102 (and thus are also positioned tangentially between each of the plurality of lugs 82). Accordingly, as shown in FIG. 4E, each of the aligned radially-extending pockets 102 and axially-extending pockets 104 together create or form an angled through-hole 106 (e.g., a first through-hole) that extends between the upper portion 83 and the lower portion 81. The angled through-holes 106 extend completely through the rotatable swashplate 80, extending between the axial lowermost edge of the lower portion 81 of the rotatable swashplate 80 and a radial-outermost side of the upper portion 83, where the middle portion of the angled through-hole 106 extends through an axial middle portion and along the inner surface of the membrane 91.

As shown in FIGS. 4B-4C and 4F, the upper portion 83 defines a plurality of tangentially-extending through-holes 108 (e.g., second through-holes) that are tangentially aligned with each of the plurality of lugs 82. The tangentially-extending through-holes 108 are positioned radially between the lugs 82 and the innermost wall 86 and extend completely through opposite sides of a base portion of the lugs 82 of the upper portion 83. The tangentially-extending through-hole 108 may extend tangentially between and connect each of the angled through-holes 106.

The various material removed (e.g., the radially-extending pockets 102, the axially-extending pockets 104, and the tangentially-extending through-holes 108) and the various portions maintained (e.g., the extensions 96, the membrane 91, and the thick sections 84a) decreases the overall weight while maintaining the structural integrity of the rotatable swashplate, while. For example, the combination of the membrane 91, the tangentially-extending through-holes 108, and the extensions 96 creates a structure similar to an I-beam, where the two axial ends (i.e., the membrane 91 and the extension 96) have additional material compared to a middle section (i.e., the tangentially-extending through-holes 108), thereby maintaining stiffness (in particular along the neutral bending axis) while minimizing weight (compared to a solid beam).

The configuration of the rotatable swashplate 80 allows the rotatable swashplate 80 to be produced with a variety of manufacturing methods (including, but not limited to, 3D printing, forcing a piece of material, or cutting away portions of a machine part) and to be implemented as a baseline design on various aircraft. The geometry of the rotatable swashplate 80 may be topologically tailored to reduce weight based on finite element analysis, for example.

FIGS. 5A-8B show a unique multi-axis machining process to produce the unique and optimized geometry of the rotatable swashplate 80. The rotatable swashplate 80 is cut in a variety of different angles and directions to obtain the specific configuration of the rotatable swashplate 80. Each of the various cuts create a variety of different types of features of the rotatable swashplate 80 at the same time, rather than each cut only creating an isolated, single feature. For example, as shown in FIGS. 5A-5B, the rotatable swashplate 80 is cut at an angle (axially downward from the outer side of the rotatable swashplate 80) to create at least a portion of both the radially-extending pocket 102 and the axially-extending pocket 104 (and thus also the angled through-hole 106), as shown with the cut area 110. This cut removes material, forms the sides of two extensions 96, and forms a portion of the inner surface of the membrane 91 (shown in other figures).

FIGS. 6A-6B show how the cut area 110 can be an axially-extending cut to create at least a portion of the axially-extending pocket 104 and a portion of the inner surface of the membrane 91. FIGS. 7A-7B show how the cut area 110 can be a radially-extending cut to create at least a portion of the radially-extending pocket 102 and a portion of the inner surface of the membrane 91. FIGS. 8A-8B show how the cut area 110 can be a tangentially-extending cut to create one of the tangentially-extending through-hole 108 and a portion of the inner surface of the membrane 91.

Comparatively, FIGS. 9A-10 show conventional rotatable swashplates 180, 280. The conventional rotatable swashplates 180, 280 are cut from the top to create pockets or hollow out sections. For example, as shown in FIG. 9A, material is removed (in the vertical direction) from the conventional rotatable swashplate 180 to create spokes (and thus pockets).

The various features or pockets of the conventional rotatable swashplate 280 shown in FIG. 10 are all cut completely through with a milling machine from top to bottom, rather than including any angled or diagonal cuts. In the conventional rotatable swashplate 180 shown in FIGS. 9A-9B, any horizontal, side cuts are isolated.

Although each of the various aspects, features, components, and configurations are not separately described for each embodiment, each of the various embodiments disclosed herein may have any of the aspects, features, components, and configurations of the other embodiments, except where noted otherwise.

As utilized herein, the terms "approximately," "substantially," and similar terms are intended to have a broad meaning in harmony with the common and accepted usage by those of ordinary skill in the art to which the subject matter of this disclosure pertains. The terms "approximately" and "substantially" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied according to alternative embodiments. Other substitutions, modifications, changes and omissions may also be made in the design, operating conditions and arrangement of the various exemplary embodiments without departing from the scope of the present invention.

What is claimed is:

1. A rotatable swashplate which rotates relative to a stationary swashplate around a shaft and connects to a pitch control rod assembly, the rotatable swashplate comprising:
an upper portion extendable outside of the stationary swashplate, the upper portion comprising:
a plurality of lugs each configured to attach to the pitch control rod assembly,
an innermost wall configured to receive the shaft, and
a membrane; and
a lower portion positionable within the stationary swashplate, the lower portion comprising:
an outermost wall, and
at least two extensions extending radially between the outermost wall and the innermost wall, the at least two extensions comprising a first extension and a second extension, the first extension comprising at least two first extension sidewalls and the second extension comprising at least two second extension sidewalls different from the at least two first extension sidewalls,
wherein the membrane extends radially over the at least two extensions so as to cover an entirety of an area disposed circumferentially between the first extension and the second extension, and
wherein at least a portion of an outer surface of the membrane comprises a concave profile, the concave profile facing axially away from the lower portion.

2. The rotatable swashplate of claim 1, wherein:
the at least two extensions further comprise a third extension;
a first portion of an area disposed circumferentially between the second extension and the third extension is covered by the membrane; and
a second portion of the area disposed circumferentially between the second extension and the third extension comprises an index link hole configured to receive an index link.

3. The rotatable swashplate of claim 1, wherein the outer surface of the membrane comprises:
a first portion radially surrounding an innermost surface of the innermost wall, the first portion comprising the at least the portion of the outer surface comprising the concave profile; and
a second portion extending radially outward of the first portion, the second portion comprising a substantially flat profile.

4. The rotatable swashplate of claim 1, wherein:
the plurality of lugs comprises a first lug, a second lug, and a third lug;
the at least two extensions further comprise a third extension; and
the first extension is radially aligned with the first lug, the second extension is radially aligned with the second lug, and the third extension is radially aligned with the third lug.

5. The rotatable swashplate of claim 4, wherein:
the plurality of lugs further comprises a fourth lug;
the at least two extensions further comprises a fourth extension;
the fourth extension is radially aligned with the fourth lug; and
the membrane further covers an entirety of an area disposed circumferentially between the third extension and the fourth extension.

6. The rotatable swashplate of claim 1, wherein the upper portion defines a plurality of radially-extending pockets that are each positioned between each of the plurality of lugs.

7. The rotatable swashplate of claim 6, wherein at least one of the radially-extending pockets extends radially between an outermost edge of the upper portion and an outer surface of the innermost wall.

8. The rotatable swashplate of claim 6, wherein the upper portion and the lower portion together define a plurality of axially-extending pockets.

9. The rotatable swashplate of claim 8, wherein the axially-extending pockets are each radially aligned with the plurality of radially-extending pockets such that each of the plurality of radially-extending pockets and each of the plurality of axially-extending pockets together create a plurality of through-holes that extend between the upper portion and the lower portion.

10. The rotatable swashplate of claim 8, wherein the plurality of axially-extending pockets each extend axially between an inner surface of the membrane and an axial lowermost edge of the lower portion.

11. The rotatable swashplate of claim 8, wherein the first extension and the second extension are each positioned tangentially between the axially-extending pockets.

12. The rotatable swashplate of claim 1, wherein the upper portion defines a plurality of through-holes that are tangentially aligned with each of the plurality of lugs.

13. The rotatable swashplate of claim 12, wherein the through-holes are positioned radially between each of the lugs and the innermost wall.

14. The rotatable swashplate of claim 1, wherein the outermost wall has a variable thickness about its lower perimeter.

15. The rotatable swashplate of claim 1, wherein the outermost wall comprises a plurality of first sections and a plurality of second sections, wherein the plurality of first sections are radially thicker than and axially aligned with the plurality of second sections.

16. A rotatable swashplate which rotates relative to a stationary swashplate around a shaft and connects to a pitch control rod assembly, the rotatable swashplate comprising:
an upper portion extendable outside of the stationary swashplate, the upper portion comprising:
a plurality of lugs each configured to attach to the pitch control rod assembly,
an innermost wall configured to receive the shaft, and
a membrane; and
a lower portion positionable within the stationary swashplate, the lower portion comprising:
an outermost wall comprising a plurality of first sections and a plurality of second sections, wherein the plurality of first sections are radially thicker than and axially aligned with the plurality of second sections, and wherein the plurality of first sections are positioned tangentially between each of the plurality of lugs and each of the plurality of second sections, and
at least one extension extending radially between the outermost wall and the innermost wall,
wherein the membrane extends radially over the at least one extension.

17. The rotatable swashplate of claim 15, wherein the plurality of second sections are tangentially aligned with each of the plurality of lugs.

18. The rotatable swashplate of claim 15, wherein an outermost surface of the outermost wall extends at a substantially constant radial position, wherein an inner surface of the outermost wall extends at different radial positions along an inner perimeter of the outermost wall.

19. A swashplate assembly positionable around a shaft and connectable to a pitch control rod assembly, the swashplate assembly comprising:
   a stationary swashplate; and
   a rotatable swashplate rotatably attached to the stationary swashplate, the rotatable swashplate comprising:
      an upper portion extendable outside of the stationary swashplate, the upper portion comprising:
         a plurality of lugs each configured to attach to the pitch control rod,
         an innermost wall configured to receive the shaft, and assembly, and
         a membrane, and
      a lower portion positionable within the stationary swashplate, the lower portion comprising:
         an outermost wall, and
         at least two extensions extending radially between the outermost wall and the innermost wall, the at least two extensions comprising a first extension and a second extension, the first extension comprising at least two first extension sidewalls and the second extension comprising at least two second extension sidewalls different from the at least two first extension sidewalls,
      wherein the membrane extends radially over the at least two extensions so as to cover an entirety of an area disposed circumferentially between the first extension and the second extension, and
      wherein at least a portion of an outer surface of the membrane comprises a concave profile, the concave profile facing axially away from the lower portion.

20. The swashplate assembly of claim 19, wherein:
   the at least two extensions further comprises a third extension;
   a first portion of an area disposed circumferentially between the second extension and the third extension is covered by the membrane; and
   a second portion of the area disposed circumferentially between the second extension and the third extension comprises an index link hole configured to receive an index link.

* * * * *